(12) United States Patent
Wehmeyer

(10) Patent No.: US 7,226,887 B2
(45) Date of Patent: Jun. 5, 2007

(54) METHOD FOR PREPARING METAL CYANIDE CATALYSTS USING POLYMERIZABLE COMPLEXING AGENTS

(75) Inventor: Richard M. Wehmeyer, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 67 days.

(21) Appl. No.: 10/533,703

(22) PCT Filed: Oct. 30, 2003

(86) PCT No.: PCT/US03/34398

§ 371 (c)(1),
(2), (4) Date: May 3, 2005

(87) PCT Pub. No.: WO2004/044034

PCT Pub. Date: May 27, 2004

(65) Prior Publication Data

US 2006/0058482 A1    Mar. 16, 2006

(51) Int. Cl.
*C08F 120/54* (2006.01)
*B01J 27/26* (2006.01)

(52) U.S. Cl. .............. 502/150; 502/159; 502/175; 526/303.1; 526/319

(58) Field of Classification Search ........... 502/175, 502/159, 150; 526/303.1, 319
See application file for complete search history.

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,404,109 A | 10/1968 | Milgrom | |
| 3,427,335 A | 2/1969 | Herold | |
| 4,456,773 A | 6/1984 | Fock | |
| 4,472,560 A | 9/1984 | Kuyper et al. | |
| 4,477,589 A | 10/1984 | van der Hulst et al. | |
| 4,877,906 A | 10/1989 | Harper | |
| 4,985,491 A | 1/1991 | Reisch | |
| 5,144,093 A | 9/1992 | Reisch et al. | |
| 5,470,813 A | 11/1995 | Le-Khac | |
| 5,563,221 A | 10/1996 | Pazos | |
| 5,639,705 A | 6/1997 | Bowman et al. | |
| 5,714,428 A | 2/1998 | Le-Khac | |
| 5,780,584 A | 7/1998 | Le-Khac et al. | |
| 5,856,367 A | 1/1999 | Barrows et al. | |
| 6,114,484 A | 9/2000 | Ward | |
| 6,355,848 B1 | 3/2002 | Antons et al. | |
| 6,423,662 B1 | 7/2002 | Molzahn et al. | |
| 6,429,342 B1 | 8/2002 | Clement et al. | |
| 6,552,163 B1 | 4/2003 | Clement et al. | |
| 2002/0198099 A1 * | 12/2002 | Ooms et al. ............. | 502/100 |

FOREIGN PATENT DOCUMENTS

| | | |
|---|---|---|
| EP | 1256596 A1 | 4/2002 |
| WO | WO-0104179 A1 | 1/2001 |
| WO | WO 0104179 A1 * | 1/2001 |
| WO | WO 0134297 A2 * | 5/2001 |
| WO | WO-0134297 A2 | 5/2001 |
| WO | WO 03080241 A1 * | 10/2003 |
| WO | WO-03080241 A1 | 10/2003 |

* cited by examiner

*Primary Examiner*—Robert D. Harlan

(57) ABSTRACT

Complexes of a metal cyanide polymerization catalyst and certain monomer complexing agents provide a method whereby heterogeneous, active metal cyanide catalysts can be prepared. The catalysts are useful alkylene oxide polymerization catalysts that are easily separated from the polymerization product and recycled.

39 Claims, No Drawings

METHOD FOR PREPARING METAL CYANIDE CATALYSTS USING POLYMERIZABLE COMPLEXING AGENTS

This invention relates to metal cyanide complexes. More particularly, it relates to metal cyanide catalysts that are complexed with specific complexing agents, to heterogeneous metal cyanide catalysts, and to methods for polymerizing alkylene oxides in the presence of a metal cyanide catalyst.

Polyethers are prepared in large commercial quantities through the polymerization of alkylene oxides such as propylene oxide and ethylene oxide. The polymerization is usually conducted in the presence of an initiator compound and a catalyst. The initiator compound usually determines the functionality (number of hydroxyl groups per molecule) of the polymer and in some instances incorporates some desired functional groups into the product. The catalyst is used to provide an economical rate of polymerization.

Metal cyanide complexes are becoming increasingly important alkylene oxide polymerization catalysts. These complexes are often referred to as "double metal cyanide" or "DMC" catalysts, and are the subject of a number of patents. Those patents include, for example, U.S. Pat. Nos. 3,278,457, 3,278,458, 3,278,459, 3,404,109, 3,427,256, 3,427,334, 3,427,335 and 5,470,813, among many others. In some instances, these metal cyanide complexes provide the benefit of fast polymerization rates and narrow polydispersities. Additionally, these catalysts sometimes are associated with the production of polyethers having very low levels of monofunctional, unsaturated compounds.

The most common of these metal cyanide complexes, zinc hexacyano-cobaltate (together with the proper complexing agent and an amount of a poly(propylene oxide)), has the advantages of being active and of forming polypropylene oxide) having very low unsaturation. However, the catalyst is quite difficult to remove from the product polyether. Because of this difficulty, and because the catalyst can be used in small amounts, the usual practice is to simply leave the catalyst in the product. However, this means that the catalyst must be replaced. In addition, the presence of the residual catalyst in the polyether product has been reported in the patent literature to cause certain performance problems. The reported problems include poor storage stability and, in some instances, interference with downstream processes. In order to reduce catalyst expense, it would be desirable to provide a catalyst that can be recovered easily from the product polyether.

In one aspect, this invention is a method for preparing a metal cyanide catalyst, comprising
a) treating a metal cyanide catalyst with a monomer complexing agent that contains at least one site of polymerizable carbon-carbon unsaturation, and
b) subjecting said treated catalyst to conditions sufficient to polymerize the monomer complexing agent to form an organic polymer having the metal cyanide catalyst dispersed therein.

In a second aspect, this invention is a polymer of a monomer having at least one site of polymerizable carbon-carbon unsaturation and a heteroatom that forms a complex with a metal cyanide catalyst, the polymer having dispersed therein a metal cyanide catalyst that is complexed with said polymer.

In a third aspect, this invention is a metal cyanide catalyst that is complexed with a monomer having at least one site of polymerizable carbon-carbon unsaturation and a heteroatom that forms a complex with a metal cyanide catalyst.

The complex of the invention includes a water insoluble metal cyanide catalyst. Some metal cyanide catalysts of this general type are well known, and are often referred to as "double metal cyanide" or "DMC" catalysts because in most instances these complexes include two different metal ions. Suitable metal cyanide catalysts can be represented by the general formula

wherein M is a metal ion that forms an insoluble precipitate with the $M^1(CN)_r(X)_t$ group;
$M^1$ and $M^2$ are transition metal ions that may be the same or different;
each X independently represents a group other than cyanide that coordinates with an $M^1$ or $M^2$ ion;
$M^3_xA_y$ represents a salt of metal ion $M^3$ and anion A, wherein $M^3$ is the same as or different than M;
b and c are positive numbers that, together with d, reflect an electrostatically neutral complex;
d is zero or a positive number;
x and y are numbers that reflect an electrostatically neutral salt;
r is from 4 to 6; t is from 0 to 2; and
n is a positive number (which may be a fraction) indicating the relative quantity of $M^3_xA_y$.

The X groups in any $M^2(X)_6$ do not have to be all the same. The molar ratio of c:d is advantageously from about 100:0 to about 20:80, more preferably from about 100:0 to about 50:50, and even more preferably from about 100:0 to about 80:20.

The term "metal salt" is used herein to refer to a salt of the formula $M_xA_y$ or $M^3_xA_y$, where M, $M^3$, x, A and y are as defined above.

M and $M^3$ are preferably metal ions selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+2}$ and $Cr^{+3}$. M and $M^3$ are more preferably $Zn^{+2}$, $Fe^{+2}$, $Co^{+2}$, $Ni^{+2}$, $La^{+3}$ and $Cr^{+3}$. M is most preferably $Zn^{+2}$.

$M^1$ and $M^2$ are preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred. $M^1$ and $M^2$ may be the same or different.

Preferred groups X include anions such as halide (especially chloride), hydroxide, sulfate, carbonate, oxalate, thiocyanate, isocyanate, isothiocyanate, $C_{1-4}$ carboxylate and nitrite ($NO_2-$), and uncharged species such as CO, $H_2O$ and NO. Particularly preferred groups X are NO, $NO_2-$ and CO.

r is preferably 5 or 6, most preferably 6 and t is preferably 0 or 1, most preferably 0. In many cases, r+t will equal six.

Suitable anions A include halides such as chloride and bromide, nitrate, sulfate, carbonate, cyanide, oxalate, thiocyanate, isocyanate, isothiocyanate, perchlorate, an alkanesulfonate such as methanesulfonate, an arylenesulfonate such as p-toluenesulfonate, trifluoromethanesulfonate (triflate) and $C_{1-4}$ carboxylate. In addition, the anion A may include a polymerizable species such as acrylate or methacrylate ion. When such a polymerizable species is used, the anion can copolymerize with the monomer complexing agent.

In this invention, a metal cyanide catalyst as just described is complexed with a monomer that has at least one site of polymerizable carbon-carbon unsaturation, and at least one heteroatom-containing group that forms a complex with the metal cyanide catalyst. Particularly suitable heteroatom-containing groups contain nitrogen, sulfur or oxygen atoms, especially oxygen atoms, and include, for example, amide, nitrile, sulfide, hydroxyl, aldehyde, ketone, ester and ether groups. Ester, ether and hydroxyl groups, or combinations of any two or more of these, are most preferred. It is even more preferred that the complexing agent contains multiple heteroatom-containing groups, especially multiple ether and/or alcohol groups.

"A site of polymerizable carbon-carbon unsaturation" refers to a group containing at least one pair of carbon atoms which are doubly or triply bonded to each other, and which can react with other like groups to form a high molecular weight polymer. Examples of such sites include ethylenic unsaturation (of the type present in vinyl acetate, vinyl alcohol and the like), acrylic or methacrylic unsaturation, alkenyl groups as are present in alkenyl aromatic monomers, and conjugated dienyl groups. In this invention, a preferred site of ethylenic unsaturation is an acrylic ($H_2C=CH-X-C(O)-$) or methacrylic group ($H_2C=C(CH_3)-C(O)-$.

Thus, one group of suitable complexing agents are vinyl monomers containing a nitrogen or oxygen atom, such as vinyl acetate, vinyl ethyl ether, vinyl 2-ethylhexanoate, vinyl isobutyl ether, vinyl methyl ketone, 1-vinyl-2-pyrrolidinone and the like.

A more preferred group of complexing agents include acrylamide, methacrylamide and their derivatives. Examples of such derivatives include N,N-dialkyl acrylamides and N,N-dialkyl methacrylamides such as N,N-dimethyl acrylamide N-isobutoxymethylacrylamide and N,N-dimethyl methacrylamide.

Even more preferably, the complexing agent is an acrylic or methacrylic ester, particularly having one or more ether and/or alcohol groups in the ester portion of the molecule. These complexing agents can be represented by the general structure

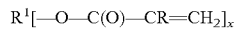

where R is hydrogen or methyl, x is a number that is at least 1, preferably from 1 to 8 and more preferably from 1 to about 3, and $R^1$ is a hydrocarbyl group (i.e., consists of only carbon and hydrogen atoms), or a substituted hydrocarbyl group that contains one or more heteroatoms that can complex with the metal cyanide catalyst, as described before. The group $R^1$ is preferably substituted with one or more ether or hydroxyl groups, or both, and may have a weight of from about 31 to about 3000 daltons or more, preferably from about 31 to about 1200 daltons.

Examples of suitable types of $R^1$ groups include (1) residues of compounds having from 1–8 (preferably 1–3) aliphatic hydroxyl groups and (2) residues of phenols or bisphenols. Compounds of the type (1) include (a) polyols such as propylene glycol, ethylene glycol, trimethylolpropane, neopentyl glycol, pentaerythritol, glycerine, dipropylene glycol and (b) poly(oxyalkylene) compounds such as poly(propylene oxide), poly(ethylene oxide), poly(propylene oxide-co-ethylene oxide) (both block and random copolymers), and alkoxylated bisphenol A and alkoxylated bisphenol F having a weight of about 50 to about 3000 daltons, especially about 100–1200 daltons, and a preferred functionality of 2–6, especially 1–3, hydroxyl groups/molecule. Examples of the type (2) compounds include bisphenol A and bisphenol F. Any of the compounds of types (1) or (2) may be substituted with one or more hydrophobic groups, especially (a) a saturated or unsaturated straight chain hydrocarbyl group of 6–24 carbon atoms which is bonded directly or indirectly to the residue or poly(alkylene oxide) chain or (b) an aryl or aryloxy group such as a phenoxy group.

Specific examples of monomer complexing agents include:

(A) esters of one or more moles of acrylic or methacrylic acid and a mole of a polyol such as propylene glycol, ethylene glycol, trimethylolpropane, neopentyl glycol, pentaerythritol, glycerine, dipropylene glycol, and diethylene glycol;

(B) esters of acrylic or methacrylic acid and ethoxylated and/or propoxylated derivatives of polyols such as those described in (A);

(C) esters of acrylic or methacrylic acid and a bisphenol such as bisphenol A, bisphenol F, an alkoxylated bisphenol A or alkoxylated bisphenol F, such as bisphenol A diacrylate;

(D) acrylamide or methacrylamide;

(E) 1-vinyl pyrrolidinone;

(F) N-substituted acrylamides, such as N,N-dimethyl acrylamide and N-(isobutoxymethyl)acrylamide;

(G) complex esters of one or more moles of acrylic or methacylic acid and (a) one or more moles of a $C_6$–$C_{24}$ straight chain saturated or unsaturated carboxylic acid and (b) a polyol such as propylene glycol, ethylene glycol, trimethylolpropane, neopentyl glycol pentaerythritol, glycerine, dipropylene glycol, diethylene glycol or an ethoxylated and/or propoxylated derivative of such a polyol; and (H) esters of acrylic or methacrylic acid and tetrahydrofurfural.

The complexed metal cyanide catalyst can be described as being represented by the formula

where L represents the monomer complexing agent and/or a mixture of the monomer complexing agent and another complexing agent, and z is a positive number representing the relative quantity of complexed L molecules. A quantity of water or additional complexing agent may also be bound into the complex. Among the catalysts of particular-interest are:

Zinc hexacyanocobaltate.zL.nZnCl$_2$;

Zn[Co(CN)$_5$NO].zL.nZnCl$_2$;

Zn$_s$[Co(CN)$_6$]$_o$[Fe(CN)$_5$NO]$_p$.zL.nZnCl$_2$ (o, p=positive numbers, s=1.5o+p);

Zn$_s$[Co(CN)$_6$]$_o$[Co(NO$_2$)$_6$]$_p$[Fe(CN)$_5$NO]$_q$.zL.nZnCl$_2$ (o, p, q=positive numbers, s=1.5(o+p)+q);

Zinc hexacyanocobaltate.zL.nLaCl$_3$;

Zn[Co(CN)$_5$NO].zL.nLaCl$_3$;

Zn[Co(CN)$_6$]$_o$[Fe(CN)$_5$NO]$_p$.zL.nLaCl$_3$ (o, p=positive numbers, s=1.5o+p);

Zn$_s$[Co(CN)$_6$]$_o$[Co(NO$_2$)$_6$]$_p$[Fe(CN)$_5$NO]$_q$.zL.nLaCl$_3$ (o, p, q=positive numbers, s=1.5(o+p)+q);

Zinc hexacyanocobaltate.zL.nCrCl$^3$;

Zn[Co(CN)$_5$NO].zL.nCrCl$_3$;

Zn$_s$[Co(CN)$_6$]$_o$[Fe(CN)$_5$NO]$_p$.zL.nCrCl$_3$ (o, p=positive numbers, s=1.5o+p);

Zn$_s$[Co(CN)$_6$]$_o$[Co(NO$_2$)$_6$]$_p$[Fe(CN)$_5$NO]$_q$.zL.nCrCl$_3$ (o, p, q=positive numbers, s=1.5(o+p)+q);

Magnesium hexacyanocobaltate.zL.nZnCl$_2$;

Mg[Co(CN)$_5$NO].zL.nZnCl$_2$;

Mg$_s$[Co(CN)$_6$]$_o$[Fe(CN)$_5$NO]$_p$.zL.nZnCl$_2$ (o, p=positive numbers, s=1.5o+p);

Mg$_s$[Co(CN)$_6$]$_o$[Co(NO$_2$)$_6$]$_p$[Fe(CN)$_5$NO]$_q$.zL.nZnCl$_2$ (o, p, q=positive numbers, s=1.5(o+p)+q);

Magnesium hexacyanocobaltate.zL.nLaCl$_3$;
Mg[Co(CN)$_5$NO].zL.nLaCl$_3$;
Mg$_s$[Co(CN)$_6$]$_o$[Fe(CN)$_5$NO]$_p$.zL.nLaCl$_3$ (o, p=positive numbers, s=1.5o+p);
Mg$_s$[Co(CN)$_6$]$_o$[Co(NO$_2$)$_6$]$_p$[Fe(CN)$_5$NO]$_q$.zL.nLaCl$_3$ (o, p, q=positive numbers, s=1.5(o+p)+q);
Magnesium hexacyanocobaltate.zL.nCrCl$_3$;
Mg[Co(CN)$_5$NO].zL.nCrCl$_3$;
Mg$_s$[Co(CN)$_6$]$_o$[Fe(CN)$_5$NO]$_p$.zL.nCrCl$_3$ (o, p=positive numbers, s=1.5o+p);
Mg$_s$[Co(CN)$_6$]$_o$[Co(NO$_2$)$_6$]$_p$[Fe(CN)$_5$NO]$_q$.zL.nCrCl$_3$ (o, p, q=positive numbers, s=1.5(o+p)+q);

as well as the various complexes such as are described at column 3 of U.S. Pat. No. 3,404,109, incorporated herein by reference. In any of the foregoing, the chloride salts can be replaced by the corresponding sulfate salts.

The metal cyanide catalyst is conveniently prepared by precipitating it from solutions or slurries of certain metal salts and metal cyanide compounds. The precipitated metal cyanide catalyst is treated with the complexing agent simultaneously with the precipitation step, afterwards, or both.

The catalyst can be precipitated from aqueous or organic solution or slurry. It is preferred to prepare the catalyst using organic compounds as solvents or dispersants, as described more below.

A first convenient method is to precipitate the metal cyanide catalyst from a solution of the starting materials in an organic compound. In this method, a solution or dispersion of a compound is mixed with a solution or dispersion of a metal salt. The solvent or dispersant includes an organic compound as described below. The soluble metal cyanide compound is represented by the general formula H$_w$[M$^1$(CN)$_r$(X)$_t$], in which M$^1$, X, r and t are as described before and w equals the absolute value of the valence of the [M$^1$(CN)$_r$(X)$_t$] group. If desired, a solution of a compound of the general formula H$_w$M$^2$(X)$_6$ may be included, either as part of the soluble metal cyanide compound solution or as a separate solution.

The organic compound is one that meets several requirements. First, it does not react with the soluble metal cyanide compound or any H$_w$M$^2$(X)$_6$ compounds that may be present. In addition, it does not react with the metal salt. It is not a solvent for the metal cyanide catalyst complex that is formed in the reaction of the metal salt and the soluble metal cyanide compound. Preferably, the organic compound is a solvent for the soluble metal cyanide compound and any H$_w$M$^2$(X)$_6$ compounds that may be used. When the catalyst is to be treated simultaneously with the precipitation step, the organic compound preferably is miscible with the monomer complexing agent. Even more preferably, the organic compound is relatively low boiling or otherwise easily separated from the monomer complexing agent. A preferred organic compound is methanol.

In the organic solution method just described, it is preferred to minimize or even eliminate water during formation of the DMC complex.

A solution of the metal cyanide compound in the organic compound can be prepared in several ways. In one preparation technique, an aqueous solution of the corresponding alkali metal cyanide salt (i.e., B$_w$[M$^1$(CN)$_r$(X)$_t$], where B represents an alkali metal ion) is formed. This may be done at an elevated temperature if necessary to dissolve the metal cyanide salt. The aqueous solution is mixed with a stoichiometric excess of a concentrated mineral acid of the form H$_d$J, where J is an anion that forms an insoluble salt with B and d is the absolute value of the valence of J. Common mineral acids such as sulfuric acid and hydrochloric acid are preferred. Sulfuric acid is preferably used at a 75% or higher concentration. Hydrochloric acid is preferably used at a 30% or higher concentration, preferably about a 37% concentration. The salt of B and J precipitates, leaving the desired soluble metal cyanide compound H$_w$[M$^1$(CN)$_r$(X)$_t$] in aqueous solution. The organic compound is then added, usually with stirring, preferably at a slightly elevated temperature in order to maintain the H$_w$[M$^1$(CN)$_r$(X)$_t$] compound in solution. Because the salt of B and J is usually hygroscopic, a significant portion of the water is removed from the solution with the salt. The salt is easily separated from the supernatant liquid by filtration, centrifuging or other solid-liquid separation technique. If desired, the salt may be washed with additional quantities of the organic compound in order to recover any occluded H$_w$[M$^1$(CN)$_r$(X)$_t$] compound.

A second method for preparing the solution of the soluble metal cyanide compound is to first form a slurry of the corresponding alkali metal cyanide salt (i.e., B$_w$[M$^1$(CN)$_r$(X)$_t$]), in a mixture of the organic compound and a stoichiometric excess of a mineral acid, preferably hydrochloric acid. The hydrochloric acid can be supplied in various ways, such as by adding concentrated aqueous HCl, introducing gaseous HCl into the organic compound, or by adding a solution of HCl in an appropriate solvent (such as diethyl ether or isopropanol). An alkali metal salt of the acid forms and precipitates from the solution, leaving the desired H$_w$[M$^1$(CN)$_r$(X)$_t$] compound dissolved in the organic compound. The precipitate is separated and washed if desired, as before.

A third convenient method of preparing the solution of the soluble metal cyanide compound is by ion exchange. An aqueous solution of the corresponding alkali metal salt (i.e., B$_w$[M$^1$(CN)$_r$(X)$_t$]) is eluted through a cation exchange resin or membrane which is originally in the hydrogen (H$^+$) form. Sufficient resin is used to provide an excess of H$^+$ ions. Suitable ion exchange resins include commonly available, gel or macroporous, crosslinked polystyrene cation exchange resins, such as those sold by The Dow Chemical Company under the trade names DOWEX® MSC-1, DOWEX® 50WX4, as well as AMBERLYST® 15 ion exchange resin, sold by Rohm & Haas. The column is typically eluted with water until the desired soluble metal cyanide compound is recovered. The water is removed from the eluent, yielding the desired soluble metal cyanide compound as solid precipitate. This precipitate is then dissolved or dispersed in the organic compound. If desired, a small amount of water may be left in the soluble metal cyanide compound when it is mixed with the organic compound.

Other ion exchange methods for preparing the solution are described by F. Hein et al., *Z. Anorg. Allg. Chem.* 270, 45 (1952) and A. Ludi et al, *Helv. Chem. Acta* 50, 2035 (1967). Yet other methods are described by Klemm et al., *Z. Anorg. Allg. Chem.* 308, 179 (1961) and in the *Handbook of Preparative Inorganic Chemistry*, G. Brauer, Ed., Ferdinand Enke Verlag, Stuttgart, 1981.

The H$_w$M$^2$(X)$_6$ compound can be made in an analogous way.

The solution of the metal salt usually can be prepared by directly dissolving the metal salt into an organic compound. The organic compound is as described above. In this solution, the organic compound is preferably the same as used in the soluble metal cyanide compound solution. If a different organic compound is used, it is preferably miscible with that used in the soluble metal cyanide compound solution.

The solutions are mixed in proportions such that an excess of the metal salt is provided, based on the amount of soluble metal cyanide compound. Preferably about 1.5 to about 4, more preferably from about 2 to about 3 moles of metal ion (M) are delivered per mole of $M^1(CN)_r(X)_t$ ion (or combined moles of $M^1(CN)_r(X)_t$ and $M^2(X)_6$ ions, when $M^2(X)_6$ ions are present). It is also preferred that the mixing be done with agitation. Agitation is preferably continued for a period after the mixing is completed. The metal cyanide catalyst, $M_b[M^1(CN)_r(X)_t]_c[M^2(X)_6]_d$, precipitates and and forms a fine dispersion in the organic compound.

An alternative method of precipitating the catalyst involves a precipitation from aqueous solutions or suspensions. Aqueous precipitation techniques are less preferred but can be used. In this method, a solution or suspension of a water-soluble metal cyanide salt or corresponding acid is combined with an aqueous solution of a water-soluble metal salt. The starting compounds are formed into separate aqueous solutions or suspensions, and those starting solutions or suspensions are mixed to precipitate the metal cyanide catalyst. Conventional aqueous precipitation techniques such as are described in U.S. Pat. Nos. 3,404,109 and 5,712,216 are suitable.

A third method of precipitating the catalyst is to precipitate it from a slurry of an insoluble metal salt or zero valent metal particles in a solution of an acidic metal cyanide compound. The insoluble metal salt is, for example an oxide, hydroxide, bicarbonate, phosphate, hydrogen phosphate, dihydrogen phosphate, silicate, titanate or zirconate of a metal M as described before. ZnO is an especially preferred insoluble metal salt. Suitable metals are zinc (most preferred), iron, cobalt, nickel, molybdenum, aluminum, vanadium, strontium, tungsten, manganese, tin, lead, copper, lanthanum and chromium. The insoluble metal salt or zero valent metal reacts with the acidic metal cyanide compound to form the salt of the metal and the acidic metal cyanide compound. If an excess of the insoluble metal salt or zero valent metal is present, additional mineral acids such as $H_2SO_4$ may be added to react with the excess insoluble metal salt or zero valent metal to form a soluble salt of the metal and the conjugate base of the additional mineral acid. Such processes are described in U.S. provisional application 60/365,666, entitled "Method for Preparing Metal Cyanide Catalysts from Insoluble Metal Salts", filed Mar. 19, 2002, and U.S. provisional application 60/366,759, entitled "Method for Preparing Metal Cyanide Catalysts Using Zero Valent Metals", filed Mar. 21, 2002, both incorporated herein by reference.

The metal cyanide catalyst is treated with the monomer complexing agent either simultaneously with or after it is precipitated. To effect simultaneous precipitation and treatment, the monomer complexing agent may be present in one or both of the starting solutions, or may be added separately at the time the starting solutions are mixed or immediately afterward. If the monomer complexing agent is not a liquid, it can be dissolved in any suitable solvent, preferably the aforementioned organic compound or another material that is miscible with the organic compound (or water or water-miscible solvent in the case of an aqueous precipitation).

The metal cyanide catalyst may be treated with the monomer complexing agent after the precipitation step. This is most easily accomplished by washing the precipitated catalyst one or more times with the monomer complexing agent or a solution thereof. It is also possible to use incipient wetness techniques to introduce the monomer complexing agent. Suitable incipient wetness techniques are described in U.S. Pat. No. 6,423,662, incorporated herein by reference.

Solvents (i.e., the organic compound and/or water) are preferably removed from the resulting catalyst complex. One method for doing this is by filtering the catalyst to remove excess fluids. The filtered catalyst complex can be washed one or more times with water, the monomer complexing agent, another complexing agent, or combinations of these, if desired. Remaining quantities of water, organic compound and other volatiles can be removed from the treated catalyst by techniques such as vacuum filtration if desired. The recovered solid catalyst complex may be dried and ground in conventional manner.

It is more preferred to recover the catalyst in the form of a slurry in excess complexing agent. This is most conveniently done when the monomer complexing agent (and other complexing agents as may be present) is less volatile than the organic compound (or water) used to prepare the starting solutions. In such a case, the organic compound and/or water may be removed through atmospheric-pressure or vacuum distillation techniques, leaving the catalyst and complexing agent(s) behind.

If the organic compound or water used to prepare the starting solutions does not interfere with the subsequent polymerization of the monomer complexing agent (or the activity of the catalyst complex), it is not necessary to isolate the catalyst complex.

The treated catalyst complex is then formed into a polymer by subjecting it to conditions sufficient to cause the monomer complexing agent to polymerize. These conditions generally include exposing the treated catalyst complex to an elevated temperature, optionally in the presence of a suitable catalyst or free radical initiator. The polymerization can be performed simultaneously with the removal of volatiles if desired.

In cases where the monomer complexing agent polymerizes in a free radical process, a free radical initiator is generally added prior to polymerization. This is conveniently done by adding the free radical initiator into one or both of the starting solutions, or by including the free radical initiator in the monomer complexing agent or in a washing step. Suitable free radical initiators include peroxy compounds and azo compounds. Redox systems that include reducing agents and oxidizing agents are also useful. Among the useful initiators are organic peroxides such as di-t-butyl peroxide, t-butylhydroperoxide, lauryl peroxide, dichlorobenzoyl peroxide, cumene hydroperoxide and the like; hydrogen peroxide, peroxycarbonates such as diisopropyl peroxydicarbonate, dicyclohexyl peroxy dicarbonate and the like, sulfonyl peroxides such as acetyl cyclohexyl sulfonyl peracetate, sulfonylhydrozides, azo compounds such as 2,2'-azobis(2,4-dimethylpentanenitrile) 2,2'-azobis(2-methylpropanenitrile) (AIBN), 2,2'-azobis(2-methylbutanenitrile (VAZO® 67), 1,1'-azobis(cyclohexanecarbonitrile) (VAZO® 88), t-butylhydroperoxide, inorganic peroxides such as ammonium peroxydisulfate, and potassium peroxy disulfate, sodium metabisulfite/ferrous ammonium sulfate and the like. The azo-type initiators are preferred.

The amount of initiator is selected to provide a controlled reaction that proceeds at an economically attractive rate. The precise amounts will vary somewhat with the particular initiator, but in general about 0.05 to about 5% by weight based on monomers is sufficient.

Curing conditions also generally include an elevated temperature, such as from about 50 to about 150° C., more preferably from about 70–130° C. The temperature of polymerization, as well as the time required to complete the polymerization, is usually dependent on the particular initiator system that is used, as different initiators tend to decompose to form free radicals at different temperatures. It is preferred to conduct the curing under reduced pressures in order to remove volatile materials from the resulting polymer.

If desired, additional monomers, i.e., those that do not complex with the metal cyanide catalyst, may be incorporated into the catalyst mixture and copolymerized with the monomer complexing agent. Such additional monomers may include, for example, include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene, ar-bromostyrene, dibromostyrene, tribromostyrene, 2,5-dichlorostyrene, bromostyrene, fluorostyrene and trifluoromethylstyrene; α,β-ethylenically unsaturated carboxylic acids and esters thereof including itaconic acid, acrylic acid, methacrylic acid, and acrylic and methacrylic esters such as methyl methacrylate, ethyl acrylate, 2-hydroxyethyl acrylate, 2-hydroxyethylmethacrylate, n-butyl acrylate, t-butyl acrylate, n-butyl methacrylate, t-butyl methacrylate, n-hexyl acrylate, maleic anhydride and the like; α,β-ethylenically unsaturated nitriles and amides such as acrylonitrile, methacrylonitrile, acrylamide, methacrylamide, N,N-dimethylacrylamide, N-(dimethylaminomethyl) acrylamide and the like, vinyl esters such as vinyl acetate; vinyl ethers; vinyl ketones; vinyl and vinylidene halides such as vinylidene chloride and vinyl chloride; maleimide, N-arylmaleimide, and N-alkymaleimides such as maleimide and N-ethyl maleimide, 1-vinyl-2-pyrrolidinone and vinyl pyridine. Among these, the monovinyl aromatic and acrylic or methacrylic esters are preferred.

Monomers containing more than one site of polymerizable carbon-carbon unsaturation can be used if desired to form a crosslinked polymer.

The polymerization may be conducted as a suspension or emulsion polymerization, so as to form discrete polymer particles complexed with the metal cyanide catalyst. In such processes, the metal cyanide catalyst complex is dispersed as droplets into a continuous phase and subjected to conditions sufficient to effect polymerization of the unsaturated complexing agent.

The cured polymer advantageously contains from about 1, preferably from about 5, more preferably from about 10, especially from about 20 weight percent, to about 75, preferably to about 65, more preferably to about 50 weight percent of metal cyanide catalyst. In this context, the weight of the metal cyanide catalyst is considered to be the weight of the $M_b[M^1(CN)_r(X)_t]_c[M^2(X)_6]_d \cdot nM^3_xA_y$ material, exclusive of any associated water or complexing agent compounds.

A supported catalyst is easily prepared by forming the polymer onto the surface of a suitable support, or by conducting the polymerization step in the presence of a support. Supports can be organic or, preferably, inorganic materials. Organic supports include polyacrylate or styrene copolymer particles, especially when crosslinked. Inorganic supports include, for example, oxides, carbides, nitrides or metals. Examples of oxides are oxides of metals of groups IIA to IVA and IB to VIIIB, especially alumina and silica. Examples of carbides include silicon carbide, boron carbide and tungsten carbide. Examples of nitrides include boron nitride, silicon nitride or aluminum nitride. Metal supports include metals and metal alloys such as steel, aluminum, noble metals, nickel, stainless steel, titanium, tantalum and canthal. Some supports of particular interest include silica gel (especially in particulate form, such as from about 60–200 mesh (U.S. Sieve)), silica chips (such as, e.g. from about 6 to about 200 mesh), alumina particulates or spheres, porous alumina spheres or particulates, polyacrylate or styrene/divinylbenzene copolymer particles, catalyst substrate spheres, and the like. Particulate supports provide the advantages of having large surface areas and being easily separated from a polyether made using the supported catalyst. However, the support may also be the interior surface of a reaction vessel such as a pipe or tubular reactor, a screen, honeycomb or other structure inserted within the reaction vessel, or the like.

Supported catalysts according to the invention advantageously contain from about 1, preferably from about 3, more preferably from about 5, especially from about 20 weight percent, to about 50, preferably to about 25, more preferably to about 15 weight percent of metal cyanide catalyst. As before, the weight of the metal cyanide catalyst is considered to be the weight of the $M_b[M^1(CN)_r(X)_t]_c[M^2(X)_6]_d \cdot nM^3_xA_y$ material, exclusive of any associated water or complexing agent compounds.

The catalyst complex of the invention is used to polymerize alkylene oxides to make polyethers. In general, the process includes mixing a catalytically effective amount of the catalyst with an alkylene oxide under polymerization conditions, and allowing the polymerization to proceed until the supply of alkylene oxide is essentially exhausted. The concentration of the catalyst is selected to polymerize the alkylene oxide at a desired rate or within a desired period of time. An amount of polymer or supported catalyst as described above sufficient to provide from about 5 to about 10,000 parts by weight metal cyanide catalyst (calculated as $M_b[M^1(CN)_r(X)_t]_c[M^2(X)_6]_d \cdot nM^3_xA_y$, exclusive of supports and any associated water or complexing agent compounds) per million parts combined weight of alkylene oxide and initiator and comonomers, if present. More preferred catalyst levels are from about 20, especially from about 30, to about 5000, more preferably about 1000 ppm, even more preferably about 100 ppm, on the same basis.

For making high molecular weight monofunctional polyethers, it is not necessary to include an initiator compound. However, to control molecular weight, impart a desired functionality (number of hydroxyl groups/molecule) or a desired terminal functional group, an initiator compound as described before is preferably mixed with the catalyst complex at the beginning of the reaction. Suitable initiator compounds include monoalcohols such methanol ethanol, n-propanol, isopropanol n-butanol, isobutanol, t-butanol 1-t-butoxy-2-propanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol and the like. The suitable monoalcohol initiator compounds include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols (including, for example, hydroxy-functional acrylic esters), cyanoalcohols, and other inertly substituted alcohols. Suitable polyalcohol initiators include ethylene glycol; propylene glycol, glycerine, 1,1,1-trimethylol propane, 1,1,1-trimethylol ethane, 1,2, 3-trihydroxybutane, pentaerythritol xylitol, arabitol mannitol, 2,5-dimethyl-3-hexyn-2,5-diol, 2,4,7,9-tetramethyl-5-decyne-4,7-diol, sucrose, sorbitol, alkyl glucosides such a methyl glucoside and ethyl glucoside and the like. Low molecular weight polyether polyols, particular those having an equivalent weight of about 350 or less, more preferably about 125–250, are also useful initiator compounds.

Among the alkylene oxides that can be polymerized with the catalyst complex of the invention are ethylene oxide, propylene oxide, 1,2-butylene oxide, styrene oxide, and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 75 weight % propylene oxide and up to about 25 weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

The polymerization reaction typically proceeds well at temperatures from about 25 to about 150° C., preferably from about 80–130° C. A convenient polymerization technique involves mixing the catalyst complex and initiator, and pressuring the reactor with the alkylene oxide. Polymerization proceeds after a short induction period, as indicated by a loss of pressure in the reactor. Once the polymerization has begun, additional alkylene oxide is conveniently fed to the reactor on demand, until enough alkylene oxide has been added to produce a polymer of the desired equivalent weight.

Another convenient polymerization technique is a continuous method. In such continuous processes, an initiator is continuously fed into a continuous reactor, such as a continuously stirred tank reactor (CSTR) or a tubular reactor that contains the catalyst. A feed of alkylene oxide is introduced into the reactor and the product continuously removed.

The catalyst of this invention is easily separated from the product polyether by any convenient solid-liquid separation, including simple filtration and centrifuging. The recovered catalyst can be re-used in further polymerization reactions.

The recovered catalyst may be washed one or more times, preferably multiple times, with water or preferably an organic solvent such as methanol, and then dried prior to being re-used. If the surface of the catalyst becomes fouled or coated with polymer, the catalyst may be washed or treated to remove the fouling or polymer coating.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably to about 4000, more preferably to about 2500, and unsaturation of no more than 0.02 meq/g, preferably no more than about 0.01 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated.

EXAMPLES 1 AND 1A

A. Preparation of Supported Catalyst 1

A 3.81 wt.-% solution of $H_3Co(CN)_6$ in methanol (17.22 g, 3.01 mmol $H_3Co(CN)_6$) is added to a mixture of zinc chloride (1.23 g, 9.03 mmol) and poly(propylene glycol) diacrylate ($M_n$ 900, Aldrich catalog #45,502-4, PPG-900-Diacrylate, 10 g, 11.11 mmol) in methanol (30 mL, 23.8 g) over a period of 13 minutes with stirring. Three ½ mL rinses of methanol are used to rinse the $H_3Co(CN)_6$ solution from its container. The resultant slurry is allowed to stir for 10 minutes. An easily stirrable slurry (57.0 g) is obtained, consisting of a finely divided suspension in methanol. The suspension is stripped on a rotoevaporator, beginning at 35° C. with increasing temperature to 70–75° C., at a vacuum of >30 inches Hg (>101.6 kPa) vacuum until the volatiles are removed. A semi-solid white product is obtained, which is heated at 70–75° C. at >30 inches Hg (>101.6 kPa) vacuum for another two hours. A pasty solid is obtained that has an acrid odor. 75 g of methanol are added to redisperse the solid. 2,2'-Azobisisobutyronitrile (AIBN, 0.2 g) is added at room temperature and allowed to disperse. The dispersion is then heated at 70–75° C. with slight vacuum and a nitrogen sweep. As methanol distills from the dispersion, a white, rubbery residue forms which peels away from the vessel walls. After the methanol has been distilled off, the residue is heated at 70–75° C./>30 inches Hg (>101.6 kPa) vacuum for about one hour to promote curing. A rubbery white product is obtained (11.6 g). The product is further cured in a vacuum oven for an additional hour under the same conditions, and then for 3.5 hours at 90–95° C./30 inches Hg (101.6 kPa) vacuum. 11.05 g of product is obtained. This is slightly less than the theoretical yield of 11.56 g.

The theoretical amount of metal catalyst contained in the product is estimated as follows. It is believed that some product losses occur, so that the amounts shown below (and corresponding amounts in subsequent examples) represent maximum amounts.

Amount $Zn_{1.5}Co(CN)_6$=3.01 mmol=0.943 g

Amount "excess" $ZnCl_2$=9.03–4.515 mmol=4.515 mmol=0.615 g.

Weight metal catalyst=0.943 g+0.615 g=1.560 g

Weight supported catalyst=11.05 g

% metal catalyst=14.1%

B. Preparation of Supported Catalyst 1A

A 3.81 wt.-% solution of $H_3Co(CN)_6$ in methanol (17.22 g, 3.01 mmol $H_3CO(CN)_6$) is added to a mixture of zinc chloride (1.23 g, 9.03 mmol) and poly(ethylene glycol) diacrylate ($M_n$ 700, Aldrich catalog #45,500-8, PEG-700-Diacrylate, 10 g, 14.29 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for another 10 minutes. 0.2 g of AIBN is added and mixed in for 8 minutes. An easily stirrable slurry (64.8 g) is obtained, consisting of a finely divided suspension in methanol. The suspension is rotated on a rotoevaporator, at 30–35° C., at an initial vacuum of about 28 inches Hg (94.8 kPa) vacuum which gradually increases to >30 inches Hg (>101.6 kPa) vacuum, until the volatiles are removed. A semi-solid white product is obtained, which is heated at 70–75° C. at >30 inches Hg (>101.6 kPa) vacuum for 90–100 minutes, and then for another 16 hours, to form 11.73 g of a rubbery product.

The amount of metal catalyst contained in the product is estimated as up to 13.3%, using the general method described in part A.

C. Polymerization of Propylene Oxide

Supported Catalyst 1 is evaluated by mixing 0.12 g of a 700 MW poly(propylene oxide) triol 0.58 g propylene oxide and a measured amount of the catalyst to a sealed vial, and heating at 90° C. for 18 hours without stirring. The conversion of the propylene oxide is then determined as an indication of the activity of the catalyst. The amount of catalyst is expressed in terms of parts of catalyst per million parts of combined weight of initiator and propylene oxide charged to the vial. When approximately 1000 ppm of the metal cyanide catalyst is used (based upon DMC complex plus excess zinc salt mass; equivalent to about 12048 ppm of the supported catalyst), essentially quantitative conversion of the propylene oxide is seen within 21 hours.

The same results are obtained when Supported Catalyst 1A is evaluated in the same manner.

EXAMPLE 2

A. Preparation of Supported Catalyst 2

A 3.81 wt.-% solution of $H_3Co(CN)_6$ in methanol (17.22 g, 3.01 mmol $H_3Co(CN)_6$) is added to a mixture of zinc chloride (1.23 g, 9.03 mmol) and trimethylolpropane propoxylate triacrylate ("TMPP-644-Triacrylate", $M_n$ about 644, Aldrich catalog #40,757-7, 10 g, 15.53 mmol) in methanol (30 mL, 23.8 g) over a period of 13 minutes with stirring. Three ½ mL rinses of methanol are used to rinse the $H_3Co(CN)_6$ solution from its container. The resultant slurry is allowed to stir for 5 minutes. Azobisisobutyronitrile (AIBN, 0.2 g) is added at room temperature and allowed to disperse with stirring for 10 minutes. An easily stirrable slurry (63.7 g) is obtained, consisting of a finely divided suspension in methanol. The suspension is stripped on a rotoevaporator at 30–35° C., at an initial vacuum of about 28 inches Hg (94.8 kPa) vacuum which gradually increases to >30 inches Hg (>101.6 kPa) vacuum, until the volatiles are removed. A semi-solid white product is obtained, which is heated at 70–75° C. and >30 inches Hg (>101.6 kPa) vacuum for 6.5 hours to provide 12.12 g of a rubbery product.

The amount of metal catalyst contained in the product is estimated as up to 12.9%, using the general method described in Example 1.

B. Polymerization of Propylene Oxide

The activity of Supported Catalyst 2 is evaluated in the manner described in Example 1C, with similar results.

EXAMPLE 3

A. Preparation of Supported Catalyst 3

A 3.81 wt.-% solution of $H_3Co(CN)_6$ in methanol (17.22 g, 3.01 mmol $H_3Co(CN)_6$) is added to a mixture of zinc chloride (0.615 g, 4.52 mmol), zinc acrylate (0.937 g. 4.52 mmol) and "TMPP-644-Triacrylate" (10 g, 15.53 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. Azobisisobutyronitrile (AIBN, 0.2 g) is added at room temperature and allowed to disperse with stirring for 10 minutes. An easily stirrable slurry (65.6 g) is obtained. The suspension is rotated on a rotoevaporator at 30–35° C., at an initial vacuum of about 28 inches Hg (94.8 kPa) vacuum which gradually increases to >30 inches Hg (>101.6 kPa) vacuum, until the volatiles are removed. A semi-solid white product is obtained, which is heated at 70–75° C. and >30 inches Hg (>101.6 kPa) vacuum for about 8 hours to provide 12.42 g of a rubbery product.

The amount of metal catalyst contained in the product is estimated as up to 15.1%, using the general method described in Example 1.

B. Polymerization of Propylene Oxide

The activity of Supported Catalyst 3 is evaluated in the manner described in Example 1C, with similar results.

EXAMPLES 4 AND 4A

A. Preparation of Supported Catalyst 4

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g. 4.52 mmol), AIBN (0.2 g, 1.22 mmol) and "TMPP-644-Triacrylate" (10 g, 15.53 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 10 minutes, and 50 g of water is added over 3–4 minutes. An easily stirrable slurry (65.6 g) is obtained. The mixture is then evacuated and back-filled with nitrogen to remove air. The mixture is then heated slowly to 38° C., 50 g of additional water are added, and the mixture again evaluated/back-filled with nitrogen to remove air. The mixture is heated to 60° C. overnight. A slight exotherm is seen. A slurry is obtained, which is vacuum filtered using Whatman® #2 filter paper to isolate the solids. The solids are then vacuum dried at 70–75° C. and >30 inches Hg (>101.6 kPa) vacuum for about 16.5 hours to provide 10.821 g of a rubbery product in the form of roughly spherical particles.

The amount of metal catalyst contained in the product is estimated as up to 17.1%, using the general method described in Example 1.

B. Preparation of Supported Catalyst 4A

A 3.70 wt.-% solution of $H_3Co(CN)_6$ in methanol (35.48 g, 6.02 mmol $H_3Co(CN)_6$) is added to a mixture of zinc chloride (1.23 g, 9.04 mmol), zinc acrylate (1.87 g, 9.04 mmol), AIBN (0.2 g, 1.22 mmol) and "TMPP-644-Triacrylate" (25 g, 38.82 mmol) in methanol (59.2 g) over a period of 15 minutes with stirring. Three ½ mL rinses of methanol are used to rinse the $H_3Co(CN)_6$ solution from its container. A slight exotherm is seen. The resultant slurry is allowed to stir for 10 minutes, and 250 g of water are added in 50 mL portions. The mixture is then evacuated and back-filled with nitrogen to remove air. The mixture is then heated slowly to 50° C. over one hour, and then to 60–64° C. for about 4 hours. Another slight exotherm is seen. A slurry is obtained, which is cooled to room temperature and vacuum filtered using Whatman® #2 filter paper to isolate the solids. The solids are rinsed with water, then with methanol, and air dried on the filter under suction for about 10 minutes. The solids are then vacuum dried at 70–75° C. and >30 inches Hg (>101.6 kPa) vacuum for about 18.5 hours to provide 26.292 g of a rubbery product in the form of roughly spherical particles.

The amount of metal catalyst contained in the product is estimated as up to 14.3%, using the general method described in Example 1.

C. Polymerization of Propylene Oxide

The activity of Supported Catalysts 4 and 4A are separately evaluated in the manner described in Example 1C, with similar results.

EXAMPLE 5

A. Preparation of Supported Catalyst 5

A 3.81 wt.-% solution of $H_3Co(CN)_6$ in methanol (17.22 g, 3.01 mmol $H_3Co(CN)_6$) is added to a mixture of zinc chloride (0.615 g, 4.52 mmol), zinc acrylate (0.937 g. 4.52 mmol) and pentaerythritol diacrylate monostearate (Penta-DAMS, Aldrich catalog #44,109-0, 10 g, 15.53 mmol) in slightly warm t-butanol (50 g) over a period of 10 minutes with stirring. Three ½ mL rinses of methanol are used to rinse the $H_3Co(CN)_6$ solution from its container. The resultant slurry is allowed to stir for 10 minutes. AIBN (0.2 g) is then added at room temperature and allowed to disperse with stirring for 10 minutes. 88.2 g of a slurry are obtained. The suspension is stripped on a rotoevaporator at 30–35° C., at an initial vacuum of about 28 inches Hg (94.8 kPa) vacuum which gradually increases to >30 inches Hg (>101.6 kPa) vacuum, until the volatiles are removed. A pasty white product is obtained, which is heated under >30 inches Hg (>101.6 kPa) vacuum at a temperature that increases from 30° C. to 75° C. Slight foaming occurs as the temperature reaches 55° C., and the product cures rapidly with exotherm to form a hard, rubbery solid. After curing at 70–75° C. under >30 inches Hg (>101.6 kPa) vacuum for 19 hours, 12.02 grams of a hard product are obtained.

The amount of metal catalyst contained in the product is estimated as up to 15.6%, using the general method described in Example 1.

B. Polymerization of Propylene Oxide

The activity of Supported Catalyst 5 is evaluated in the manner described in Example 1C, with similar results.

EXAMPLE 6

A. Preparation of Supported Catalyst 6

A 3.81 wt.-% solution of $H_3Co(CN)_6$ in methanol (17.22 g, 3.01 mmol $H_3Co(CN)_6$) is added to a mixture of zinc chloride (1.23 g, 9.03 mmol) and trimethylolpropane ethoxylate triacrylate ("TMPE-912-Triacrylate", $M_n$ about 912, Aldrich catalog #41,219-8, 10 g, 10.96 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.2 g) is added at room temperature and allowed to disperse with stirring for 10 minutes. An easily stirrable slurry (65.4 g) is obtained, consisting of a finely divided suspension in methanol. The suspension is stripped on a rotoevaporator at 30–38° C., at an initial vacuum of about 28 inches Hg (94.8 kPa) vacuum which gradually increases to >30 inches Hg (>101.6 kPa) vacuum, until the volatiles are removed. A semi-solid white product is obtained, which is heated at 50° C. and 30 inches Hg (101.6 kPa) vacuum for 40 minutes. The resulting product is cured at 70–75° C./>30 inches Hg (>101.6 kPa) vacuum for about 15 hours. A hard rubbery product weighing 11.89 grams is obtained.

The amount of metal catalyst contained in the product is estimated as up to 15.8%, using the general method described in Example 1.

B. Polymerization of Propylene Oxide

The activity of Supported Catalyst 6 is evaluated in the manner described in Example 1C, with similar results.

EXAMPLE 7

A. Preparation of Supported Catalyst 7

A 3.81 wt.-% solution of $H_3Co(CN)_6$ in methanol (17.22 g, 3.01 mmol $H_3Co(CN)_6$) is added to a mixture of zinc chloride (0.615 g, 4.52 mmol), zinc acrylate (0.937 g, 4.52 mmol) and neopentyl glycol propoxylate diacrylate ("NGP diacrylate", $M_n$ 328, Aldrich catalog #41,214-7, 10 g, 30.49 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.2 g) is added at room temperature and allowed to disperse with stirring for 10 minutes. An easily stirrable slurry (62.5 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for 30 minutes. The resulting product is cured further at 70–75° C./>30 inches Hg (>101.6 kPa) vacuum for about 15 hours. A hard rubbery product weighing 12.34 grams is obtained.

The amount of metal catalyst contained in the product is estimated as up to 15.2%, using the general method described in Example 1.

B. Polymerization of Propylene Oxide

The activity of Supported Catalyst 7 is evaluated in the manner described in Example 1C, with similar results.

EXAMPLE 8

A. Preparation of Supported Catalyst 8

A 3.81 wt.-% solution of $H_3Co(CN)_6$ in methanol (17.22 g, 3.01 mmol $H_3Co(CN)_6$) is added to a mixture of zinc chloride (0.615 g, 4.52 mmol), zinc acrylate (0.937 g, 4.52 mmol) and neopentyl glycol ethoxylate diacrylate ("NGE diacrylate", $M_n$ 300, Aldrich catalog #41,213-9, 10 g, 33.33 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.2 g) is added at room temperature and allowed to disperse with stirring for 10 minutes. An easily stirrable slurry (64.1 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for 30 minutes. The resulting product is cured further at 70–75° C./>30 inches Hg (>101.6 kPa) vacuum for about 15 hours. A hard rubbery product weighing 12.38 grams is obtained.

The amount of metal catalyst contained in the product is estimated as up to 15.2%, using the general method described in Example 1.

B. Polymerization of Propylene Oxide

The activity of Supported Catalyst 8 is evaluated in the manner described in Example 1C, with similar results.

17

EXAMPLE 9

A. Preparation of Supported Catalyst 9

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and bisphenol-A ethoxylate diacrylate ("Bis-A-E diacrylate", $M_n$ 688, Aldrich catalog #41,210-4, 10 g, 14.53 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 7 minutes. AIBN (0.2 g) is added at room temperature and allowed to disperse with stirring for 13 minutes. An easily stirrable slurry (63.8 g) is obtained, consisting of a finely divided suspension in methanol. The suspension is rotated on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for about an hour. The resulting product is cured further at 70–75° C./>30 inches Hg (>101.6 kPa) vacuum for about 15 hours. A hard rubbery product weighing 12.17 grams is obtained.

The amount of metal catalyst contained in the product is estimated as up to 15.7%, using the general method described in Example 1.

B. Polymerization of Propylene Oxide

The activity of Supported Catalyst 9 is evaluated in the manner described in Example 1C, with similar results.

EXAMPLE 10

A Preparation of Supported Catalyst 10

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and tetrahydrofurfuryl methacrylate ("THF-methacrylate", $M_n$ 170, Aldrich catalog #40945-6, 10 g, 58.75 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.2 g) is added at room temperature and allowed to disperse with stirring for 10 minutes. An easily stirrable slurry (64.3 g) is obtained, consisting of a finely divided suspension in methanol. The suspension is stripped on a rotoevaporator at 30–35° C.~28 inches Hg (~94.8 kPa) vacuum with a nitrogen sweep until the volatiles are removed. A pasty white product is obtained, which is cured at 50° C. and 28 inches Hg (94.8 kPa) vacuum for about an hour, then at 70–75° C. and 15–20 inches Hg (50.8–67.7 kPa) vacuum for 25 minutes. The resulting product is cured further at 70–75° C./>30 inches Hg (>101.6 kPa) vacuum for about 17 hours. A product weighing 12.09 grams is obtained. The product is hard and brittle at room temperature but elastic and rubbery when heated.

The amount of metal catalyst contained in the product is estimated as up to 15.6%, using the general method described in Example 1.

B. Polymerization of Propylene Oxide

The activity of Supported Catalyst 10 is evaluated in the manner described in Example 1C, with similar results.

18

EXAMPLE 11

A. Preparation of Supported Catalyst 11

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and 2-hydroxy-3-phenoxypropyl acrylate ("HPP acrylate", $M_n$ 222, Aldrich catalog #40736-4, 10 g, 45 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.2 g) is added at room temperature and allowed to disperse with stirring for 10 minutes. An easily stirrable slurry (66.5 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for about an hour and then at 70–75° C. and 15–20 inches Hg (50.8–67.7 kPa) vacuum for 25 minutes. The pressure is then reduced to >30 inches Hg (>101.6 kPa) vacuum with slight nitrogen sweep for 19 hours. A product weighing 10.93 grams is obtained. The product is hard and brittle at room temperature but elastic and rubbery when heated, and it adheres strongly to the sides of the reaction vessel.

The amount of metal catalyst contained in the product is estimated as up to 17.2%, using the general method described in Example 1.

B. Polymerization of Propylene Oxide

The activity of Supported Catalyst 11 is evaluated in the manner described in Example 1C, with similar results.

EXAMPLE 12

A. Preparation of Supported Catalyst 12

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and di(ethylene glycol)-2-ethylhexyl ether acrylate ("DEG-EH-Acrylate", $M_n$ 272, Aldrich catalog #40754-2, 10 g, 36.71 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.2 g) is added at room temperature and allowed to disperse with stirring for 10 minutes. An easily stirrable slurry (64.9 g) is obtained, consisting of a finely divided suspension in methanol. The suspension is stripped on a rotoevaporator at 30–38° C./~28 inches Hg (~94.8 kPa) vacuum with a nitrogen sweep until the volatiles are removed. A pasty white product is obtained, which is cured at 50° C. and 28 inches Hg (94.8 kPa) vacuum for about an hour, and then at 70–75° C. and 15–20 inches Hg (50.8–67.7 kPa) vacuum for 25 minutes. The vacuum is then increased to >30 inches Hg (>101.6 kPa) vacuum with slight nitrogen sweep for 16 hours. A hard and slightly rubbery product weighing 11.88 grams is obtained.

The amount of metal catalyst contained in the product is estimated as up to 15.8%, using the general method described in Example 1.

B. Polymerization of Propylene Oxide

The activity of Supported Catalyst 12 is evaluated in the manner described in Example 1C, with similar results.

EXAMPLE 13

A. Preparation of Supported Catalyst 13

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and glycerol dimethacrylate (technical grade (85%), $M_n$ 228, Aldrich catalog #43,689-5, 10 g, 43.81 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.1 g) is added at room temperature and allowed to disperse with stirring for 10 minutes. An easily stirrable slurry (66.6 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for about 70 minutes and then at 70–75° C. and 15–20 inches Hg (50.8–67.7 kPa) vacuum for 25 minutes. The pressure is then reduced to >30 inches Hg (>101.6 kPa) vacuum with slight nitrogen sweep for about 16 hours. A hard and brittle product weighing 11.82 grams is obtained.

The amount of metal catalyst contained in the product is estimated as up to 15.9%, using the general method described in Example 1.

B. Polymerization of Propylene Oxide

The activity of Supported Catalyst 13 is evaluated in the manner described in Example 1C, with a somewhat slower polymerization rate being observed.

EXAMPLE 14

A. Preparation of Supported Catalyst 14

A 3.70 wt.-% solution of $H_3Co(CN)_6$ in methanol (17.74 g, 3.01 mmol $H_3Co(CN)_6$) is added to a mixture of zinc chloride (1.23 g, 9.03 mmol), and t-butanol (20 g, 270 mmol) in methanol (20 g) over a period of 10 minutes with stirring. The resultant slurry is allowed to stir for 25 minutes. The reaction flask is fitted with a distillation head equipped with a nitrogen/vacuum inlet, thermocouple probe and glass stopper. The slurry is evacuated and backfilled with nitrogen several times, and heated in stages up to 70° C. to distill methanol. The residue is allowed to stand overnight under a nitrogen pad.

Then, 15 g of t-butanol is added, and the reaction mixture again evacuated and backfilled with nitrogen several times, followed by a second distillation at temperatures increasing to 79° C. The mixture is cooled to 40° C. and the glass stopper replaced with a rubber septum. Glycidyl methacrylate (Aldrich catalog #14, 1230-8, 1.076 g) is added over 5 minutes via syringe and allowed to heat at 40° C. for 10 minutes, and then an additional 3.045 g. of glycidyl methacrylate is added over 10 minutes. The mixture is allowed to stir for 3 hours at 40° C., and then 3.213 g more of glycidyl methacrylate are added. After mixing for 30 minutes, the reaction temperature is increased slowly to 50° C., held at that temperature for 75 minutes, and then increased to 65° C. and held at that temperature overnight. The mixture is then heated to 78° C. over 3 hours and cooled to room temperature. A rubbery product with a small amount of oily residue is obtained, from which solvents are distilled briefly at 70–75° C./30 inches Hg (101.6 kPa) vacuum. The product is then cured further in a vacuum oven at 70–75° C./>30 inches Hg (>101.6 kPa) vacuum for 25 hours to produce a somewhat hard polymer.

The amount of metal catalyst contained in the product is estimated as up to 14.9%, using the general method described in Example 1.

B. Polymerization of Propylene Oxide

The activity of Supported Catalyst 14 is evaluated in the manner described in Example 1C, with similar results.

EXAMPLE 15

A. Preparation of Supported Catalyst 15

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and N-(isobutoxymethyl)acrylamide ($M_n$ 157, Aldrich catalog #43653-4, 10 g, 63.61 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.2 g) is added at room temperature and allowed to disperse with stirring for 10 minutes. An easily stirrable slurry (66.5 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for about 75 minutes and then at 70–75° C./15–20 inches Hg (50.8–67.7 kPa) vacuum for 25 minutes. The pressure is then reduced to >30 inches Hg (>101.6 kPa) vacuum with slight nitrogen sweep for about 18 hours. A hard and brittle product weighing 11.57 grams is obtained.

The amount of metal catalyst contained in the product is estimated as up to 16.2%, using the general method described in Example 1.

B. Polymerization of Propylene Oxide

The activity of Supported Catalyst 15 is evaluated in the manner described in Example 1C, with similar results.

EXAMPLE 16

A. Preparation of Supported Catalyst 16

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and acrylamide (10 g, 140.7 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.05 g) is added at room temperature and allowed to disperse with stirring for 10 minutes. An easily stirrable slurry (71.2 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A solid white product is obtained, which is cured at 50° C. and 28 inches Hg (94.8 kPa) vacuum for about 35 minutes. The resulting product is cured further at 70–75° C./22 inches Hg (74.5 kPa) vacuum for 40 minutes, and then the pressure is reduced to >30 inches Hg (>101.6 kPa) vacuum with slight nitrogen sweep for about 16 hours. A hard, white foamed product weighing 11.97 grams is obtained.

The amount of metal catalyst contained in the product is estimated as up to 15.7%, using the general method described in Example 1.

B. Polymerization of Propylene Oxide

The activity of Supported Catalyst 16 is evaluated in the manner described in Example 1C, with a somewhat slower polymerization rate being noted.

EXAMPLE 17

A. Preparation of Supported Catalyst 17

A 3.70 wt.-% solution of $H_3Co(CN)_6$ in methanol (17.74 g, 3.01 mmol $H_3Co(CN)_6$) is added to a mixture of zinc chloride (0.615 g, 4.52 mmol), zinc acrylate (0.937 g, 4.52 mmol) and N,N-dimethylacrylamide (10 g, 100.9 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.05 g) is added at room temperature and allowed to disperse with stirring for 10 minutes. An easily stirrable slurry (64.4 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for 70 minutes. The resulting product is cured further at 70–75° C./22 inches Hg (74.5 kPa) vacuum for 45 minutes, and then the pressure is reduced to >30 inches Hg (>101.6 kPa) vacuum with slight nitrogen sweep for about 16 hours. A hard and somewhat brittle product weighing 11.13 grams is obtained.

The amount of metal catalyst contained in the product is estimated as up to 16.9%, using the general method described in Example 1.

B. Polymerization of Propylene Oxide

The activity of Supported Catalyst 17 is evaluated in the manner described in Example 1C, with similar results.

EXAMPLE 18

A. Preparation of Supported Catalyst 18

A 3.84 wt.-% solution of $H_3Co(CN)_6$ in methanol (17.09 g, 3.01 mmol $H_3Co(CN)_6$) is added to a mixture of zinc chloride (0.615 g, 4.52 mmol), zinc acrylate (0.937 g, 4.52 mmol) and 1-vinyl-2-pyrrolidinone (10 g, 89.98 mmol) in methanol (30 mL, 23.8 g) over a period of 10 minutes with stirring. Three ½ mL rinses of methanol are used to rinse the $H_3Co(CN)_6$ solution from its container. The resultant slurry is allowed to stir for 5 minutes. AIBN (0.05 g) is added at room temperature and allowed to disperse with stirring for 10 minutes. An easily stirrable slurry (75.8 g) is obtained, consisting of a finely divided suspension in methanol. The suspension is stripped on a rotoevaporator at 30–35° C./~28 inches Hg (~94.8 kPa) vacuum with a nitrogen sweep until the volatiles are removed. A pasty white product is obtained, which is cured at 50° C. and 28 inches Hg (94.8 kPa) vacuum for about 5–10 minutes. Because some distillation begins to occur, the vacuum is reduced to 10–15 inches Hg (33.9–50.8 kPa) vacuum and these conditions maintained another 40 minutes. The resulting product is cured further at 70–75° C./5 inches Hg (16.9 kPa) vacuum for 3 hours and then the pressure is reduced to >30 inches Hg (>101.6 kPa) vacuum with slight nitrogen sweep for an additional 105 minutes. 11.88 grams of a solid product that is somewhat pliable when warm is obtained.

The amount of metal catalyst contained in the product is estimated as up to 15.9%, using the general method described in Example 1.

B. Polymerization of Propylene Oxide

The activity of Supported Catalyst 18 is evaluated in the manner described in Example 1C, with a somewhat slower polymerization rate being observed.

EXAMPLE 19

A. Preparation of Supported Catalyst 19

A 3.84 wt.-% solution of $H_3Co(CN)_6$ in methanol (17.09 g, 3.01 mmol $H_3Co(CN)_6$) is added to a mixture of zinc chloride (0.615 g, 4.52 mmol), zinc acrylate (0.937 g, 4.52 mmol), trimethylolpropane propoxylate triacrylate ("TMPP-470-Triacrylate", $M_n$ 470, Aldrich catalog #40,756-9, 2 g, 4.26 mmol), 3-(trimethoxysilyl)propyl methacrylate (MW 248, Aldrich catalog #44,015-9, 2 g, 8.05 mmol) and AIBN (0.03 g) in methanol (20 mL, 15.8 g) over a period of 10 minutes with stirring. Three ½ mL rinses of methanol are used to rinse the $H_3Co(CN)_6$ solution from its container. The resultant slurry is allowed to stir for 15 minutes. An easily stirrable slurry (42.1 g) is obtained, consisting of a finely divided suspension in methanol.

Silica gel (Davisil™ Grade 646, 35–60 mesh, 150 Angstrom pore size, Aldrich catalog #23,684-5, 50 g) is added to a stripping flask, and the slurry is added in small batches over 30 minutes with occasional mild agitation. The resulting mixture is dried on a rotoevaporator for 15 minutes at room temperature and 20 inches Hg (67.7 kPa) vacuum with a nitrogen sweep until the silica becomes free-flowing without clumps. The vacuum is then increased to 20–25 inches Hg (67.7–84.7 kPa) vacuum for another 15 minutes. The temperature and pressure are then increased to 30–35° C. and 25–26 inches Hg (84.7–88 kPa) vacuum, and methanol begins to distill. After 15 minutes, a white, free-flowing silica product is obtained. The temperature is then increased to 50° C. for 30 minutes, and then to 75° C. [still at 25–26 inches Hg (84.7–88 kPa) vacuum] for 20 minutes. The vacuum is then increased to >30 inches Hg (>101.6 kPa) vacuum for about 15 hours. The resulting product consists of silica gel particles having a coating that contains active catalyst. The amount of metal catalyst contained in the product is estimated as up to 3.52%, using the general method described in Example 1.

B. Polymerization of Propylene Oxide

The activity of Supported Catalyst 19 is evaluated in the manner described in Example 1C, with similar results.

EXAMPLE 20

A. Preparation of Methanolic $H_3Co(CN)_6$ Solution $K_3Co(CN)_6$ (10.0 g, 30.09 mmol) is dissolved in deionized water (23.3 g) while heating to 45° C. Concentrated sulfuric acid (96%, 12.3 g, ~120.4 mmol) is added dropwise over about 10 minutes with stirring. Methanol (100 g) is added over a total of 5–10 minutes. A white precipitate forms during the methanol addition. The slurry is then cooled to about 10° C., and vacuum filtered to remove the precipitate. A light yellow filtrate is obtained, weighing 150.23 g and theoretically containing 4.49% by weight $H_3Co(CN)_6$.

B. Preparation of Supported Catalyst 20

A portion of the 4.49 wt.-% solution of $H_3Co(CN)_6$ in methanol from part A above (48.57 g, ~10.0 mmol $H_3Co(CN)_6$) is added to a slurry of zinc oxide (3.09 g, 38.0 mmol) and trimethylolpropane (2.44 g, 18.2 mmol) in methanol (20 mL, 15.8 g) over a period of 75 minutes with rapid stirring. The resultant slurry is allowed to stir for 15 minutes. An easily stirrable slurry is obtained, consisting of a finely divided suspension in methanol, with some unreacted zinc oxide present. This slurry is heated at 50° C. for two hours. Poly(ethylene glycol) dimethacrylate ("PEG(200)-DMA", 121.76 g, 368.9 mmol) and AIBN (0.109 g) are added to the slurry at 26° C., and the resulting mixture stirred for 15 minutes. The slurry is gradually heated to 50° C. over about an hour. An exotherm occurs as the polymerization begins, raising the slurry temperature to about 60–62° C. The slurry thickens, and 80 mL of methanol is added. The mixture is stirred for 3 hours at 60° C., and allowed to sit overnight at room temperature.

The mixture is then reheated to 60° C. for about five hours, cooled to room temperature and vacuum filtered. The solids are washed with methanol and air dried with suction for about one hour. The solids are then dried in a vacuum oven at 76° C. and 26 inches Hg (84.7 kPa) vacuum with a nitrogen sweep for 15 hours. The drying conditions are increased to 120° C./25 inches Hg (84.7 kPa) vacuum for one hour, and further increased to 150° C./30 inches Hg (101.6 kPa) vacuum for three hours. The resulting product weighs 121.23 g. The amount of metal catalyst contained in the product is estimated as up to 4.27%, using the general method described in Example 1.

C. Polymerization of Propylene Oxide

The activity of Supported Catalyst 20 is evaluated in the manner described in Example 1C, with similar results.

What is claimed is:

1. A catalyst complex comprising a water insoluble metal cyanide catalyst that is complexed with a monomer complexing agent that has at least one polymerizable site of carbon-carbon unsaturation.

2. The catalyst complex of claim 1, which is represented by the structure $$M_b[M^1(CN)_r(X)_t]_c[M^2(X)_6]_d \cdot zL \cdot nM^3_xA_y$$

wherein M is a metal ion that forms an insoluble precipitate with the $M^1(CN)_r(X)_t$ group; $M^1$ and $M^2$ are transition metal ions that may be the same or different;

each X independently represents a group other than cyanide that coordinates with an $M^1$ or $M^2$ ion;

$M^3_xA_y$ represents salt of metal ion $M^3$ and anion A, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2;

n is a positive number indicating the relative quantity of $M^3_xA_y$;

L represents the complexing agent and z is a positive number representing the relative quantity of complexed L molecules.

3. The catalyst complex of claim 2, which is a zinc hexacyanocobaltate catalyst complex wherein $M^3$ is zinc.

4. The catalyst complex of claim 1, wherein the monomer complexing agent is a vinyl monomer containing a nitrogen or oxygen atom.

5. The catalyst complex of claim 4, wherein the monomer complexing agent is vinyl acetate, vinyl ethyl ether, vinyl 2-ethylhexanoate, vinyl isobutyl ether, vinyl methyl ketone, 1-vinyl-2-pyrrolidinone or a mixture of two or more thereof.

6. The catalyst complex of claim 1, wherein the monomer complexing agent is acrylamide, methacrylamide, an N,N-dialkyl acrylamide or an N,N-dialkyl methacrylamide.

7. The catalyst complex of claim 1, wherein the monomer complexing agent is an acrylic or methacrylic ester.

8. The catalyst complex of claim 7, wherein the acrylic or methacrylic ester has one or more ether and/or alcohol groups in the ester portion of the molecule.

9. The catalyst complex of claim 8, wherein the acrylic or methacrylic ester is represented by the structure $$R^1[-O-C(O)-CR=CH_2]_x$$

where R is hydrogen or methyl, x is a number that is at least 1 and $R^1$ is (1) the residue of a compound having from 1–8 aliphatic hydroxyl groups, (2) the residue of a phenol or bisphenol.

10. The catalyst complex of claim 9, wherein the acrylic or methacrylic ester is (A) an ester of one or more moles of acrylic or methacrylic acid and a mole of propylene glycol, ethylene glycol, trimethylolpropane, neopentyl glycol, pentaerythritol, glycerine, dipropylene glycol, diethylene glycol or an ethoxylated and/or propoxylated derivative of any of the foregoing, (B) a complex ester of one or more moles of acrylic or methacylic acid and (a) one or more moles of a $C_6$–$C_{24}$ straight chain saturated or unsaturated carboxylic acid and (b) propylene glycol, ethylene glycol, trimethylolpropane, neopentyl glycol, pentaerythritol, glycerine, dipropylene glycol, diethylene glycol or an ethoxylated and/or propoxylated derivative of any of the foregoing; or (C) a mixture of two or more of (A) and/or (B).

11. A polymer having dispersed therein a metal cyanide catalyst that is complexed with said polymer, formed by subjecting the catalyst complex of claim 1 to conditions sufficient to polymerize the monomer complexing agent.

12. A polymer having dispersed therein a metal cyanide catalyst that is complexed with said polymer, formed by subjecting the catalyst complex of claim 3 to conditions sufficient to polymerize the monomer complexing agent.

13. A polymer having dispersed therein a metal cyanide catalyst that is complexed with said polymer, formed by subjecting the catalyst complex of claim 4 to conditions sufficient to polymerize the monomer complexing agent.

14. A polymer having dispersed therein a metal cyanide catalyst that is complexed with said polymer, formed by subjecting the catalyst complex of claim 5 to conditions sufficient to polymerize the monomer complexing agent.

15. A polymer having dispersed therein a metal cyanide catalyst that is complexed with said polymer, formed by subjecting the catalyst complex of claim 6 to conditions sufficient to polymerize the monomer complexing agent.

16. A polymer having dispersed therein a metal cyanide catalyst that is complexed with said polymer, formed by subjecting the catalyst complex of claim 7 to conditions sufficient to polymerize the monomer complexing agent.

17. A polymer having dispersed therein a metal cyanide catalyst that is complexed with said polymer, formed by subjecting the catalyst complex of claim 9 to conditions sufficient to polymerize the monomer complexing agent.

18. A polymer having dispersed therein a metal cyanide catalyst that is complexed with said polymer.

19. The polymer of claim 18, wherein the polymer is a polymer of a vinyl monomer containing a nitrogen or oxygen atom.

20. The polymer of claim 19, wherein the polymer is a polymer of acrylamide, methacrylamide, an N,N-dialkyl acrylamide or an N,N-dialkyl methacrylamide.

21. The polymer of claim 19, wherein the polymer is a polymer of an acrylic or methacrylic ester.

22. The polymer of claim 18, wherein the polymer is a polymer of
(A) an ester of one or more moles of acrylic or methacrylic acid and a mole of propylene glycol, ethylene glycol, trimethylolpropane, neopentyl glycol, pentaerythritol, glycerine, dipropylene glycol, diethylene glycol or an ethoxylated and/or propoxylated derivative of any of the foregoing,
(B) a complex ester of one or more moles of acrylic or methacylic acid and (a) one or more moles of a $C_6$–$C_{24}$ straight chain saturated or unsaturated carboxylic acid and (b) propylene glycol, ethylene glycol, trimethylolpropane, neopentyl glycol, pentaerythritol, glycerine, dipropylene glycol, diethylene glycol or an ethoxylated and/or propoxylated derivative of any of the foregoing; or
(C) a mixture of two or more of (A) and/or (B).

23. A method of making a polymerization catalyst, comprising
a) treating a metal cyanide catalyst with a complexing agent having at least one site of polymerizable carbon-carbon unsaturation, and
b) subjecting said treated catalyst to conditions sufficient to polymerize said complexing agent to form a polymer containing the metal cyanide catalyst dispersed within it.

24. The method of claim 23, wherein the metal cyanide catalyst is represented by the structure

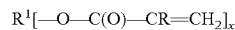

wherein M is a metal ion that forms an insoluble precipitate with the $M^1(CN)_r(X)_t$ group;
$M^1$ and $M^2$ are transition metal ions that may be the same or different;
each X independently represents a group other than cyanide that coordinates with an $M^1$ or $M^2$ ion;
$M^3_xA_y$ represents salt of metal ion $M^3$ and anion A, wherein $M^3$ is the same as or different than M;
b and c are positive numbers that, together with d, reflect an electrostatically neutral complex;
d is zero or a positive number;
x and y are numbers that reflect an electrostatically neutral salt;
r is from 4 to 6; t is from 0 to 2;
n is a positive number indicating the relative quantity of $M^3_xA_y$;
L represents the complexing agent and z is a positive number representing the relative quantity of complexed L molecules.

25. The method of claim 24, wherein the polymerization is performed in the presence of a free radical initiator.

26. The method of claim 24, wherein the metal cyanide catalyst is precipitated from starting solutions or suspensions, and step b) is conducted simultaneously with the precipitation of the catalyst.

27. The method of claim 25, wherein the free radical initiator is an azo-type initiator.

28. The method of claim 23, wherein the monomer complexing agent is a vinyl monomer containing a nitrogen or oxygen atom.

29. The method of claim 23, wherein the monomer complexing agent is vinyl acetate, vinyl ethyl ether, vinyl 2-ethylhexanoate, vinyl isobutyl ether, vinyl methyl ketone, 1-vinyl-2-pyrrolidinone or a mixture of two or more thereof.

30. The method of claim 23, wherein the monomer complexing agent is acrylamide, methacrylamide, an N,N-dialkyl acrylamide or an N,N-dialkyl methacrylamide.

31. The method of claim 23, wherein the monomer complexing agent is an acrylic or methacrylic ester.

32. The method of claim 31, wherein the acrylic or methacrylic ester has one or more ether and/or alcohol groups in the ester portion of the molecule.

33. The method of claim 32, wherein the acrylic or methacrylic ester is represented by the structure

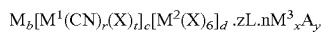

where R is hydrogen or methyl, x is a number that is at least 1, and $R^1$ is (1) the residue of a compound having from 1–8 aliphatic hydroxyl groups, (2) the residue of a phenol or bisphenol.

34. The method of claim 33, wherein the acrylic or methacrylic ester is
(A) an ester of one or more moles of acrylic or methacrylic acid and a mole of propylene glycol, ethylene glycol, trimethylolpropane, neopentyl glycol, pentaerythritol, glycerine, dipropylene glycol, diethylene glycol or an ethoxylated and/or propoxylated derivative of any of the foregoing,
(B) a complex ester of one or more moles of acrylic or methacylic acid and (a) one or more moles of a $C_6$–$C_{24}$ straight chain saturated or unsaturated carboxylic acid and (b) propylene glycol, ethylene glycol, trimethylolpropane, neopentyl glycol, pentaerythritol, glycerine, dipropylene glycol, diethylene glycol or an ethoxylated and/or propoxylated derivative of any of the foregoing; or
(C) a mixture of two or more of (A) and/or (B).

35. The method of claim 23, wherein volatiles are stripped from the catalyst prior to polymerization of the monomer complexing agent.

36. The method of claim 23, wherein volatiles are stripped from the catalyst simultaneously with the polymerization of the monomer complexing agent.

37. The method of claim 23, wherein step b is performed in the presence of a support.

38. The method of claim 37, wherein the support is a particulate silica, silica chips, alumina particulates or spheres, porous alumina spheres or particulates, polyacrylate or styrene/divinylbenzene copolymer particles or catalyst substrate spheres.

39. A method of making a polyether, comprising subjecting a mixture of an alkylene oxide and an initiator compound to conditions sufficient to polymerize the alkylene oxide while in the presence of the polymer of claim 11.

* * * * *